(12) United States Patent
De Gouveia

(10) Patent No.: US 11,797,912 B2
(45) Date of Patent: Oct. 24, 2023

(54) UNIQUE OBJECT FACE ID

(71) Applicant: Paulo Ferro De Gouveia, Olival Basto (PT)

(72) Inventor: Paulo Ferro De Gouveia, Olival Basto (PT)

(73) Assignee: Deutsche Post AG, Bonn (DE)

( * ) Notice: Subject to any disclaimer, the term of this patent is extended or adjusted under 35 U.S.C. 154(b) by 256 days.

(21) Appl. No.: 17/222,362

(22) Filed: Apr. 5, 2021

(65) Prior Publication Data
US 2021/0312216 A1 Oct. 7, 2021
US 2022/0138486 A9 May 5, 2022

(30) Foreign Application Priority Data

Apr. 6, 2020 (EP) .................................... 20168132

(51) Int. Cl.
G06Q 10/0833 (2023.01)
G06T 7/50 (2017.01)
G06Q 10/0837 (2023.01)
G06T 7/00 (2017.01)
G06V 20/64 (2022.01)
G06F 18/2413 (2023.01)
G06V 30/424 (2022.01)

(52) U.S. Cl.
CPC ..... *G06Q 10/0833* (2013.01); *G06F 18/2413* (2023.01); *G06Q 10/0837* (2013.01); *G06T 7/001* (2013.01); *G06T 7/50* (2017.01); *G06V 20/647* (2022.01); *G06V 30/424* (2022.01); G06T 2207/30164 (2013.01)

(58) Field of Classification Search
CPC ............ G06Q 10/0833; G06F 18/2413; G06F 16/90344; G06T 7/001; G06T 7/50; G06V 20/647; G06V 30/424

USPC .................................................. 382/101, 103
See application file for complete search history.

(56) References Cited

U.S. PATENT DOCUMENTS

2019/0095744 A1* 3/2019 Hager ................ G06Q 10/0838

FOREIGN PATENT DOCUMENTS

EP 3 270 342 A1 1/2018
JP 2015072578 A * 4/2015

OTHER PUBLICATIONS

Anonymous: "Base64—Wikipedia", Mar. 21, 2020 (Mar. 21, 2020), XP93037944, Retrieved Apr. 6, 2023:URL:https://en.wikipedia.org/w/index.php?title=Base64&oldid=946661581.

* cited by examiner

*Primary Examiner* — Ayodeji O Ayotunde
(74) *Attorney, Agent, or Firm* — Reinhart Boerner Van Deuren P.C.

(57) ABSTRACT

An apparatus is disclosed which is configured to perform or control obtaining or causing obtaining at least one image of at least a part of an object; obtaining or causing obtaining information representative of a distance between at least one feature of the object present in the image and at least one reference feature of the object present in the image; generating or causing generating a string of characters based on the obtained information, the string of characters comprising at least a first portion representative of the distance between the at least one feature of the object present in the image and the at least one reference feature of the object present in the image; associating or causing associating information representing the string of characters with process information of the object.

24 Claims, 5 Drawing Sheets

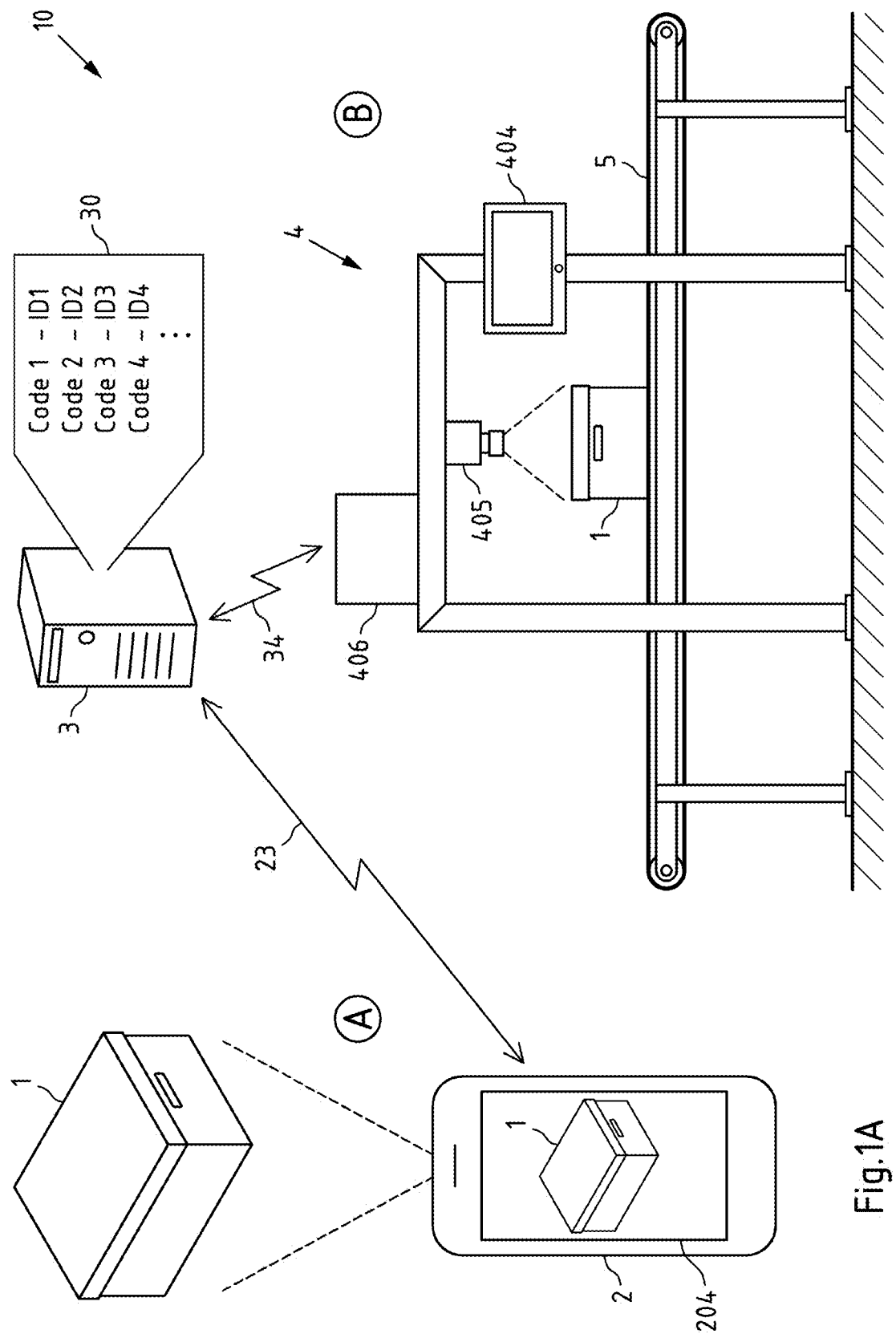

UNIQUE OBJECT FACE ID

CROSS-REFERENCE TO RELATED PATENT APPLICATIONS

This patent application claims priority to European Patent Application No. 20168132.7, filed Apr. 6, 2020, the entire teachings and disclosures are incorporated herein by reference thereto.

FIELD OF THE DISCLOSURE

The invention relates in general to the field of identifying and recognizing objects, in particular in the field of logistics, in particular to methods, apparatuses, systems and computer programs enabling improved identifying and recognizing objects such as consignment units.

BACKGROUND

With rising ecommerce, a number of consignment units that are shipped per time increases, and both logistics providers and customers handle an increased number of consignment units to be shipped. In view of this, a reliable way of uniquely identifying objects of various kinds and in particular of consignment units is desirable. In this sense, for example identification labels may be disadvantageous as they may become unreadable as a result of damage upon shipping or may even get lost. At the same time, for example in case of return shipments, replacement of original labels by return labels may correspond to a source of error which may cause loss of shipments.

SUMMARY OF SOME EXAMPLE EMBODIMENTS OF THE INVENTION

It is inter alia an object of the invention to provide an improved way of identifying and recognizing objects of various kinds, in particular of consignment units such as parcels and/or transport boxes.

According to a first exemplary aspect of the invention, a method performed by at least one first apparatus is disclosed, the method comprising:
- obtaining or causing obtaining at least one image of at least a pan of an object;
- obtaining or causing obtaining information representative of a distance between at least one feature of the object present in the image and at least one reference feature of the object present in the image;
- generating or causing generating a string of characters based on the obtained information, the string of characters comprising at least a first portion representative of the distance between the at least one feature of the object present in the image and the at least one reference feature of the object present in the image;
- associating or causing associating information representing the string of characters with process information of the object.

The method according to the first aspect of the invention may for instance be performed by an apparatus or by a system that comprises a plurality of apparatuses. The apparatus or system may for instance form a part of a device for registering an object, e.g. or a consignment unit to be shipped, and for associating information identifying the object with process information of the object. The at least one first apparatus may further correspond to or be incorporated in a mobile device.

According to a second exemplary aspect of the invention, a method performed by at least one second apparatus is disclosed, the method comprising:
- obtaining or causing obtaining at least one image of at least a part of an object;
- obtaining or causing obtaining information representative of a distance between at least one feature of the object present in the image and at least one reference feature of the object present in the image;
- generating or causing generating a first string of characters based on the obtained information, the first string of characters comprising at least a first portion representative of the distance between the at least one feature of the object present in the image and the at least one reference feature of the object present in the image;
- determining or causing determining whether or not a second string of characters is present in a database comprising a first portion corresponding to the first portion of the first string of characters;
- initiating or causing initiating a first predetermined operation based on process information associated with the second string of characters in the database, if a second string of characters is determined to be present in the database.

The method according to the second aspect of the invention may for instance be performed by an apparatus or by a system that comprises a plurality of apparatuses. The apparatus or system may for instance correspond to or be comprised by a dedicated device, e.g. used in a facility of a logistics and/or postal company. The at least one second apparatus may correspond to or be incorporated in a mobile device e.g. used in combination with such device.

For all aspects of the invention presented above (referred to as the "respective aspect" below), the following is disclosed:

A computer program according to the respective aspect of the invention, the computer program when executed by a processor causing an apparatus or system to perform or control the method according to the respective aspect of the invention.

A computer readable storage medium according to the respective aspect of the invention, in which the computer program according to the respective aspect of the invention is stored. The computer readable storage medium could for example be a disk or a memory or the like. It may for instance be tangible and/or non-transitory. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

An apparatus according to the respective aspect of the invention, which is configured to perform or comprises respective means for performing or controlling the method according to the respective aspect of the invention. The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means.

An apparatus according to the respective aspect of the invention, comprising at least one processor and at least one memory including computer program code, the at least one memory and the computer program code configured to, with the at least one processor, cause an apparatus (e.g. the apparatus according to the respective aspect of the invention) at least to perform or control the method according to the respective aspect of the invention.

A system according to the respective aspect of the invention, the system comprising a plurality of apparatuses and configured to perform or comprises respective means for performing or controlling the method according to the respective aspect of the invention.

The disclosed apparatus according to any aspect or the invention may be a module or a component for a device, for example a chip and/or processor. Alternatively, the disclosed apparatus according to any aspect of the invention may be a device, for instance a server or other electronic device. The disclosed apparatus according to any aspect of the invention may comprise only the disclosed components (e.g. means) or may further comprise one or more additional components.

Furthermore, according to a third aspect of the invention, a system is disclosed, the system comprising an apparatus or system according to the first aspect of the invention and an apparatus or system according to the second aspect of the invention.

In other words, a system is disclosed that may comprise:
at least one first apparatus configured for:
obtaining or causing obtaining at least one image of at least a part of an object;
obtaining or causing obtaining information representative of a distance between at least one feature of the object present in the image and at least one reference feature of the object present in the image;
generating or causing generating a string of characters based on the obtained information, the string of characters comprising at least a first portion representative of the distance between the at least one feature of the object present in the image and the at least one reference feature of the object present in the image;
associating or causing associating information representing the siring of characters with process information of the object;
and
at least one second apparatus configured for:
obtaining or causing obtaining at least one image of at least a part of the object;
obtaining or causing obtaining information representative of a distance between at least one feature of the object present in the image and at least one reference feature of the object present in the image;
generating or causing generating a first string of characters based on the obtained information, the first string of characters comprising at least a first portion representative of the distance between the at least one feature of the object present in the image and the at least one reference feature of the object present in the image;
determining or causing determining whether or not a second string of characters is present in a database comprising a first portion corresponding to the first portion of the first string of characters;

initiating or causing initiating a first predetermined operation based on process information associated with the second string of characters in the database, if a second string of characters is determined to be present in the database.

One or more of the features and/or embodiments disclosed in the following may further define the first and/or second aspect of the invention.

The method according to the first aspect may be understood to correspond to a registering method for registering unique features of an object (which may essentially be an object of arbitrary shape and/or type) in a particularly advantageous way. In correspondence, the method according to the second aspect may be understood to correspond to a method of using the registered features for example for identifying and/or recognizing the object. In other words, the methods according to the first and second aspects advantageously enable detection and matching of a set of recognizable data which is unique to an object. Thereby, objects addressable by the methods according to the first and second aspects may respectively belong to a specific type, a type being e.g. a box, or a car, or even an animal. Each of such types may be characterized by a corresponding set of base features (examples of features referred to as reference features further herein) which are representative for the particular type. Features specific to a particular object addressed by the methods according to the first and/or second aspect (e.g. the at least one feature, the distance of which to the at least one reference feature is represented by the obtained information) are in an exemplary embodiment recognizable deviations from the standard type, like a scratch, an ink spot, a hole, a damaged edge, on or of a box. Employing the methods according to the first and/or second aspect, such specific features are used for generating a string of characters, in an exemplary embodiment a base64 string. This coding scheme is of particular advantage as it allows carrying data stored in binary formats across media/channels. An advantage of this encoding scheme is that it leaves data unlikely to be modified upon its transmission through information systems. In an exemplary embodiment, the string of characters, e.g. after a step of base64 encoding, generation of the string of characters may further comprise employing a hash function for converting its value into a compressed numerical value. This value may be referred to as a unique object identifier, a UOID.

In an exemplary embodiment, the method according to the first aspect and/or the method according to the second aspect comprises:
obtaining or causing obtaining information representative of a three-dimensional shape, in particular of a depth, of the at least one feature of the object present in the image.

In other words, in an exemplary embodiment, the string of characters is not only generated based on distance information, but the generation takes into account more specific three-dimensional shape information of the specific features of the object. For example, depths of such features may be taken into account employing techniques like point clouds. In this way, also depth information of features and/or texture of objects is taken into account for generating the uniquely identifying string of characters.

In an exemplary embodiment, the at least one first apparatus corresponds to or is comprised by a dedicated device comprising a digital camera or scanner and/or connected to a digital camera or scanner and is thus configured to obtain (e.g. acquire) the at least one image (e.g. a digital image) of the object using the digital camera and/or the scanner. The dedicated device may e.g. be a device used by a courier of a postal and/or logistics company configured for acquiring an image of a consignment unit such as a parcel to be shipped and/or a storage box to be transported. In addition or alternatively, in an exemplary embodiment the at least one first apparatus may correspond to or be comprised by a mobile device, e.g. used by said courier. Thereby, the mobile device is in an exemplary embodiment a handheld computing device, a smartphone, a tablet computer, a notebook computer, a smart watch, or a smart band.

In an exemplary embodiment, the at least one second apparatus comprises or corresponds to a dedicated device connected to and/or comprising a digital camera or digital scanner and is thus configured to obtain (e.g. acquire) the at least one image (e.g. a digital image) of the object using the digital camera and/or the scanner. The dedicated device may e.g. be installed at a facility of a postal and/or logistics company and may be employed for facilitating processes such as identification, tracking, sorting, relaying, and/or distribution processes. For example, the dedicated device may be installed in association with a conveyor belt and may be arranged to acquire images of consignment units and/or storage boxes passing the camera along the conveyor belt. Further, in an exemplary embodiment the at least one second apparatus may correspond to or be comprised by a mobile device e.g. used by personnel of the postal and/or logistics company and/or may be (e.g. removably) installed in a vicinity of a conveyor belt for acquiring images of objects passing along the conveyor belt. Thereby, the mobile device is in an exemplary embodiment a handheld computing device, a smartphone, a tablet computer, a notebook computer, a smart watch, or a smart band.

It is noted that in an exemplary embodiment, the methods according to the first and/or second aspect not only take into account distance information between specific features and reference features but advantageously further take into account angle and/or orientation information. In other words, in an exemplary embodiment the method according to the first aspect and/or the method according to the second aspect comprises at least one of:

obtaining or causing obtaining information representative of at least one angle representative of an orientation of the at least one feature with respect to a reference system of the object.

The reference system is in an exemplary embodiment defined based on the at least one reference feature.

As a result, the method according to the first aspect enables uniquely identifying an object (in an exemplary embodiment a parcel and/or transport box) based on a feature of the object (in an exemplary embodiment a feature visible on a surface of the object) included in an image oldie object. In other words, the method according to the first aspect enables uniquely identifying an object based on physical attributes (i.e. features) of the object. It is noted that in an exemplary embodiment, the at least one feature of the object (e.g. the at least one physical attribute of the object) is a macroscopic feature (or attribute) of the object. In this respect, the method according to the first aspect may at an initial stage (e.g. in the steps of obtaining) be understood as being similar to a face recognition method which recognizes a face based on features or attributes of a face such as geometrical features, dimensions and/or based on positions of such features, e.g. based on positions of a nose and/or of eyes.

However, as opposed to such methods, the method according to the first aspect of the invention is applicable to a larger variety of objects in particular as it generates the unique string of characters, e.g. a code. In other words, the methods according to the first and second aspects use information representative of distances (and thus of relative positions) between features of an object, and in exemplary embodiments corresponding angular/orientation information, to generate a uniquely identifying string of characters (e.g. a code) which enables a particularly efficient handling of a large number of objects and which is applicable to various classes of objects. The methods according to the first and second aspect are therefore in principle applicable to various objects of different types as the may be applied to arbitrary surfaces having specific features such as a dent at a specific location, a specific scratch at a specific location, etc. Further, while conventional methods such as face recognition methods take into account only generic features or attributes e.g. common to faces of persons in general (noses, eyes, etc.), the methods according to the first and second aspects are further applicable to a larger class of objects, as relations between features unique to an object under inspection (e.g. scratches and/or marks, and/or handwriting present on a transport box) and features common to the whole object class (e.g. edges of the transport box) are used for generating the uniquely identifying string of characters.

The method according to the second aspect being a method corresponding to the method according to the first aspect obtains a string of characters from an image of an object in a same manner as the method according to the first aspect. Accessing a database, the method according to the second aspect may then in exemplary embodiments determine further processing of the object based on process information associated with the string of characters in the database. Similarly as in case of the method according to the first aspect, the method according to the second aspect enables a particularly efficient processing of a large number of objects in a short time as only respective strings of characters of small size need to be processed. In other words, in an exemplary embodiment, the method according to the first aspect may be understood as enabling first a detection of key unique features of an object such as scratches with specific lengths, orientations and/or depths in an image of an object and registering information on these features in binary form. The method according to the second aspect may then e.g. use such registered information for identifying the object.

It is noted that while the methods according to the first and/or second aspect may generate in an exemplary embodiment a single string of characters (e.g. the UOID), in an exemplary embodiment, information on individual specific features (information on the at least one feature, e.g., "feature descriptors") used for the generation of the string of characters is associated with the information representing the string of characters (e.g. is stored in association with the information representing the string of characters).

In other words, in an exemplary embodiment, the method according to the first aspect and/or the method according to the second aspect comprises:

obtaining or causing obtaining information representative of the at least one feature of the object present in the image and/or of the at least one reference feature;

associating or causing associating information representing the string of characters with the obtained information representative of the at least one feature and/or of the at least one reference feature.

Thereby, in an exemplary embodiment, the information representative of the at least one feature of the object comprises at least position information of the at least one feature and/or the at least one reference feature in relation to the object and/or three-dimensional shape information of the at least one feature and/or of the at least one reference feature.

In this way, such additional information may advantageously be used for validation purposes. This embodiment is advantageous as it may enable a "repair function". For example, if features originally used for generating the string of characters are destroyed or amended e.g. during a transport process of the object, the additionally stored information of the original features may enable an algorithm to still identify an object based on remaining/non-destroyed features.

The methods according to the first and second aspect may be applicable to a large number of objects, e.g. to consignment units such as in particular parcels. At the same time, these methods may similarly applicable to different objects including for example live animals. Based on the possibility to uniquely identify and thus handle such objects, the methods according to the first and second aspects are in particular suitable for registering, verifying, and/or counting of such objects. In other words, in an exemplary embodiment, the object addressed by the method according to the first and/or the second aspect corresponds to or comprises at least one of a consignment unit, a transport box, a living animal, a vehicle, a non-conveyable/unpacked object. In other words, objects addressable by the method according to the first and/or the second aspect comprise objects of types comprising features such as key-points, landmarks, and/or characteristics which can be uniquely identified.

Thus, in accordance with the methods according to the first and the second aspects of the invention, at least one image of at least a part of an object, e.g. of a consignment unit, is obtained. In an exemplary embodiment, the at least one image is acquired with a digital camera comprised by the at least one first and/or the at least one second apparatus and may correspond to one or more single shot images and/or to images comprised by a video sequence acquired by the at least one first and/or by the at least one second apparatus.

In the methods according to the first and the second aspects, information representative of a distance between the at least one feature of the object present in the image and the at least one reference feature of the object present in the image is obtained. It is noted that in an exemplary embodiment, the distance is independent of an orientation of the object. To this end, for example an orientation of the object upon obtaining the image of the object may be taken into account and may be employed for obtaining the "real" distance along a surface of the object as opposed to a projected surface.

The information representative of the distance between the at least one feature and the reference feature may correspond to information (e.g. data) corresponding to individual distances (e.g. measured in centimeters or millimeters) and/or to position information of the at least one feature provided in relation to a reference system which may be represented and/or representable by the at least one reference feature. It is noted that in an exemplary embodiment, the distance between the at least one feature of the object and the at least one reference feature is a distance along a face and/or surface of the object, in particular along a planar face and/or surface of the object. For example, the distance may correspond to a distance along a surface of a parcel or a transport box and may correspond to a distance between a feature present on this surface and an edge or corner of the parcel or the box.

It is noted that a face of a box represents an example of a generic template for representing the object type of an object generically known as a box. In a similar way, various objects can be classified into object types that can be represented by one or more respective templates. Such templates may describe generic or standard physical/geometrical properties and/or dimensions of a type or class of objects. For example, a box may be characterized by physical/geometrical relations distinct from a cylinder or a pyramid, which correspond to distinct object-types. In order to facilitate application of the methods according to the first and/or second aspect, in an exemplary embodiment, a template corresponding to the object addressed by the method according to the first and/or second aspect may be used for facilitating a section of the reference features. In this way, e.g. undesirable background "noise" during capture of features of an object can be advantageously reduced. Thereby, it is noted that a template may be understood to correspond to a three dimensional mathematical model of the object addressed by the method according to the first and/or second aspect.

In other words, in an exemplary embodiment, the method according to the first and/or second aspect comprises:
identifying or causing identifying the at least one feature and/or the at least one reference feature based on a model, in particular based on a three-dimensional model, of the object.

Thus, in an exemplary embodiment, one or more features (or attributes) of the object that are visible in the image are identified, e.g. using suitable image processing algorithms and/or software, and a position of the one or more identified features is determined in relation to at least one reference feature. In an exemplary embodiment, an image processing algorithm is configured for obtaining a fingerprint of a feature included in an image of the object. Further in an exemplary embodiment, the at least one feature and/or the at least one reference feature respectively corresponds to a local feature, e.g. extracted from a sub-region of the obtained image. For example, in the exemplary embodiment, if a number of 4 features are identified in the obtained image, 4 vectors may be generated for describing a respective shape, length, orientation, of each of the 4 features, each vector being defined in relation to a reference system defined for the object. In an exemplary embodiment, the method comprises obtaining at least one global feature, in particular representative of a colors and/or a texture of the object. Such global features may be used in addition to be added to a representation of the object. In this way, e.g. finding of further occurrences of a same object in a database may be facilitated.

In an exemplary embodiment, the methods according to the first and the second aspect thus comprise a step of identifying or causing identifying the at least one feature of the object in the image and/or the reference feature of the object present in the image. Thereby, in an exemplary embodiment, the at least one reference feature is a generic and/or typical feature common to a plurality of objects included in a class of objects further including the object. For example, if the object is a box (included in the class "boxes"), the at least one reference feature may correspond to an edge and/or corner of the box. In other words, in an exemplary embodiment, the object is a box, in particular a parcel, and the at least one reference feature is an edge and/or a corner of the box. In this way, the at least one reference feature provides a reference system for further features or attributes that are unique to the object. More generally, in an exemplary embodiment, a reference feature is a feature of an object agnostic to space transformation, in particular invariant to scaling, rotation and/or translation and/or a feature agnostic to photometric transformation, in particular geometrical edges of an object.

It is noted that in an exemplary embodiment, a randomly handwritten mark may serve as reference feature and distances between this handwritten mark as reference feature and further features of a parcel (e.g. an imprint present on the parcel and/or edges or corners of the parcel) may be employed for obtaining information representative of a distance between at least one feature of the object present in the image and at least one reference feature of the object present in the image Further, the at least one feature (or attribute) of the box, the distance of which with respect to the reference feature is obtained, is a feature unique for the object. In an exemplary embodiment, the feature corresponds to or comprises a surface pattern, one or more scratches, one or more appended stickers, one or more imprints; one or more handwritten markings, one or more damaged spots and/or areas. Thereby, a surface pattern is a macroscopic pattern and may for example correspond to a decorative pattern of colors and/or structures provided on one or more outer faces of a parcel or a transport box. As mentioned, such additional global features like colors and textures may advantageously contribute to the full representation of the object, in particular in cases where color variations help to distinguish one object from another object. For example, a drop of yellow ink may be sufficient to distinguish one parcel from another parcel). The one or more scratches may correspond to a single or a group of portions where a parcel or a transport box have been damaged, e.g. upon previous use and/or transport. The one or more stickers and/or the one or more imprints may be provided on one or more surfaces e.g. of a parcel or a transport box for decorative purposes e.g. by a vendor of a product included in the parcel and/or the transport box. Such sticker and/or imprint may e.g. comprise and/or relate to a label, a trademark and/or a brand name of such vendor. The one or more handwritten markings may correspond to a word and/or to a mark (e.g. a simple line or cross) for example provided on one or more outer surfaces of a parcel and/or a transport box by a customer who wants to make use of a label-less return service, this service being based on the unique string of characters instead of or in addition to a conventional return label.

In the methods according to the first and the second aspect, the string of characters is generated based on the obtained information, the string of characters comprising at least a first portion representative of the distance between the at least one feature of the object present in the image and the at least one reference feature of the object present in the image. In other words, one or more information elements representative of distances between respective features and reference features of the object are converted into a string of characters, e.g. a code, the string of characters uniquely representing the one or more distances. As mentioned above, in particular depending on the specifics of used features (e.g. in case of scratches), also the relative angle and/or orientation relative to a reference system (e.g. defined by face edges/corners) may be taken into account. As the features of the object are unique features of the respective object, these features are suitable to unambiguously distinguish the object from a different object even when included in the same class of objects. For example, an arbitrary scratch present on a first parcel is suitable to distinguish this individual first parcel from a second parcel which otherwise may appear identical to the first parcel. A distance of the scratch to a reference feature such as a corner and/or edge of the first parcel is thus likewise suitable to distinguish the first parcel from the second parcel and thus to uniquely identify the first parcel. In this way, the string of characters generated using a suitable algorithm that unambiguously converts such one or more distances into a string of characters is likewise suitable to uniquely identify the first parcel.

Thus, in an exemplary embodiment, one or more features of an object are converted into a string of characters employing a base64 encryption followed by a hash function. In this way, in the exemplary embodiment, a unique object identifier ("UOID") is generated. For example, converting an image (e.g. a photo) of a human face may yield a base64 code "4aeORXhpZgAATUOAKgAAAAgADwEOAAIAAAA-BAAAAAAEPAAIAAAAF AAAIzgEQAAIAAAAKA-AAI1" which may then be converted into a hash string "BBFB8B7069A1BCA335D41684887BDE2A" (the unique object identifier, UOID).

In an exemplary embodiment, the string of characters further comprises a second portion comprising position information representative of a location at which the at least one image of the at least a part of the object has been acquired. In addition or alternatively, in an exemplary embodiment, the string of characters further comprises a third portion representative of a point in time when the at least one image is acquired.

For example, a camera comprised by the at least one first apparatus may be configured for obtaining geographical coordinates based on a satellite positioning system and/or based on an indoor positioning system as position information when acquiring the at least one image of the at least a part of the object. In other words, in an exemplary embodiment, the method according to the first aspect further comprises a step of obtaining or causing obtaining position information representative of a location at which the at least one image of the at least a part of the object has been acquired and generating or causing generating a second portion of the string of characters based on the obtained position information. Thereby, in an exemplary embodiment, generating the second portion of the string of characters comprises geocoding the position information. In addition or alternatively, in an exemplary embodiment, the method according to the first aspect further comprises obtaining or causing obtaining time stamp information as information indicative of the point in time when acquiring the image of the at least a part of the object and coding the time stamp information for generating a third portion of the string of characters.

For example and without limitation, the string of characters may correspond to a string "162537.726372.211020191759" in which sub-string "162537" corresponds to the first portion, in which sub-string "726372" corresponds to the second portion (geocoded position information), and in which sub-string "211020191759" corresponds to the third portion (coded timestamp). It is noted that in an exemplary embodiment, generating the first portion of the string of characters and/or generating the second portion of the string of characters comprises employing or causing employing a hash function.

While the first portion of the string of characters may advantageously be employed for identifying and recognizing the object, the second and/or the third portion of the string of characters may advantageously be employed for validation purposes described further herein. In an exemplary embodiment, the string of characters is in accordance with the industry standard ISO/IEC 15459-4 & 5. In this way, compatibility of the string of characters as identifier of the object with different identifiers is ensured.

As mentioned above, while a method according to the first aspect may generate in an exemplary embodiment a single string of characters (UOID), in an exemplary embodiment, information on individual specific features used for the generation is associated with the information representing the string of characters (e.g. is stored in association with the information representing the string of characters). In this way, such additional information may advantageously be used for validation purposes. This embodiment is advantageous as it may enable a "repair function". For example, if features originally used for generating the string of characters are destroyed or amended e.g. during a transport process of the object, the additionally stored information of the original features may enable an algorithm to still identify an object based on remaining/non-destroyed features.

According to the first aspect, the method comprises associating or causing associating information representing the string of characters with process information of the object. In an exemplary embodiment, process information of the object is information suitable for triggering processing of the object based on the string of characters identifying the object. For example in case of a consignment unit such as a parcel to be shipped or a storage box handled in a general logistics process, such process information may correspond to a destination and/or to a (permanent or intermediate) storage location of the object. In an exemplary embodiment, process information comprises geo-location, information on expected operational handling, information on temperature and/or weight.

Further, process information may in addition or alternatively in an exemplary embodiment correspond to or comprise information relating to a content of the parcel or the box, e.g. characterizing the content in terms of a safety and/or security status (e.g. if the content comprises goods classified as dangerous). In this way, based on process information, a first predetermined operation may be outputting of corresponding information via a display of the at least one second apparatus and/or outputting of corresponding control information triggering one or more necessary security operations.

In an exemplary embodiment, associating the information representing the string of characters with the process information of the object may comprise storing or causing storing the information representing the string of characters with the process information of the object. For example, in case the at least one first apparatus corresponds to or is comprised by the mentioned dedicated device, this device may comprise or may be connected to a dedicated database for storing the process information in association with the string of characters. As mentioned above, in an exemplary embodiment, information on the at least one feature is further stored in association with the string of characters which advantageously enables said repair function. Similarly, in case of the at least one first apparatus being a mobile device, the process information may be stored in association with the string of characters in a corresponding storage of the mobile device.

Alternatively or in addition, in an exemplary embodiment, associating the information representing the string of characters with the process information of the object comprises providing or causing providing the information representing the string of characters in association with the process information of the object to be accessible by at least one external apparatus, in particular via a communication path. Thereby, in an exemplary embodiment, the at least one external apparatus corresponds to or is comprised by a network server and/or server cloud. Thus, for example, the dedicated device and/or the mobile device (examples of the at least one first apparatus) may transmit information representing the string of characters together with the process information of the object to a server and/or sever cloud to be stored at the server and/or the server cloud.

In the context of the present disclosure, communication path is to be understood as a (bi-directional) wireless and/or wired connection i.e. a wireless connection that enables a network entity to transmit and receive data via said connection. Examples of a wireless connection include a wireless communication path or link in a wireless communication network, in particular a terrestrial wireless communication network like a Wireless Local Area Network (WLAN) or a cellular network. WLAN is for example specified by the standards of the IEEE 802.11 family (http://www.ieee.org/). A cellular network may for example be a mobile phone network like a 2G/3G/4G/5G cellular communication network. The 2G/3G/4G/5G cellular radio communication standards are developed by the 3GPP and presently available under http://www.3gpp.org/. A wireless connection may further include a Device-to-Device (D2D) communication path. Examples of a wired connection include a Local Area Network (LAN) connection, and/or any further wired computer connection, e.g. a bus, in particular a Universal Serial Bus (USB), connection, and/or in particular an internet connection.

In an exemplary embodiment, the method according to the first and/or the second aspect comprises a step of employing or causing employing a spatial transformation and/or a photometric transformation of the at least part of the object. Employing a spatial transformation may advantageously facilitate obtaining a distance between a certain feature and a reference feature, e.g. a distance between a scratch on a surface of the parcel and a corner of the parcel. It is noted that in case of at least two features, the obtained information may further comprise information representative of a relative distance and/or relative orientation of the at least two features. The spatial transformation may e.g. transform such parcel, which may be visible in the obtained image under an angle by (virtually and/or arithmetically) rotating the parcel by the inverse of the angle and may thus convert a projected distance visible in the obtained image into a real distance.

In an exemplary embodiment, the step of obtaining the information representative of the distance between the at least one feature of the object and the at least one reference feature of the object comprises obtaining or causing obtaining the distance based on a three-dimensional model (e.g. said template) of the at least a part of the object. Such three-dimensional model may in an exemplary embodiment be understood as corresponding to a template of the object, i.e. to an idealized version of the object, e.g. only representing the main geometrical aspects of the object. For example, in case that the object corresponds to a parcel and/or to a transport box, such three-dimensional model corresponds in an exemplary embodiment to a cuboid. Such three-dimensional model facilitates determining true distances between a feature of the object and a reference feature of the object, in particular in case that the at least a part of the object is visible in the obtained image under an angle. Such three-dimensional model may further also facilitate the described spatial transformation.

In an exemplary embodiment, the method according to the first and/or the second aspect comprises a step of obtaining or causing obtaining the three-dimensional model from a database. In other words, in an exemplary embodiment the at least one first and/or the at least one second apparatus comprises a database, e.g. stored in a corresponding storage at the at least one first and/or the at least one second apparatus. In an additional or alternative exemplary embodiment, the at least one first and/or the at least one second apparatus is connected to a database via the communication path disclosed herein. In the latter case, in an exemplary embodiment, the database is stored at a network device, e.g. at a network server and/or at a network server cloud.

Alternatively or in addition, in an exemplary embodiment, the method according to the first and/or the second aspect comprises a step of generating or causing generating the three-dimensional model based on the at least one obtained image, in particular at the at least one first apparatus. In other words, the at least one first apparatus and/or the at least one second apparatus may be configured to generate the three-dimensional model based on at least one, e.g. based on a combination of several, two-dimensional images acquired via a camera of the at least one first apparatus and/or of the at least one second apparatus. This may be advantageous, e.g. in case no three-dimensional object is found in the database that is suitable for characterizing the object, at least part of which is present in the obtained image. Thus, for example in such case, in an exemplary embodiment, the method according to the first and/or according to the second aspect comprises storing or causing storing the generated three-dimensional model at the database. In the latter case, in an exemplary embodiment, the method comprises transmitting the generated three-dimensional model to the network device via the communication path.

Use of the three-dimensional model (the template) turned out to be in particular advantageous as it enables identifying a class (e.g. a particular type of parcel or transport box of predetermined (e.g. standardized) size and/or shape) of a three-dimensional object part of which is present in the obtained (two-dimensional) image in a fast and reliable manner. For example, having obtained the image of the at least a part of the object, the at least one first and/or the at least one second apparatus is in an exemplary embodiment configured for employing a template matching process, in particular communicating with the database (of the at least one first and/or the at least one second apparatus and/or via communication with the network device via the communication path), for identifying the class of the object at least pan of which is visible in the obtained image. Thus, in an exemplary embodiment, the method according to the first and/or the second aspect comprises identifying or causing identifying the object based on a template matching process. In an exemplary embodiment, the template matching process makes use of artificial intelligence technology for further improving speed and reliability of the process.

In an exemplary embodiment, the method according to the first and/or the second aspect comprises obtaining or causing obtaining an angle between a camera used for acquiring the image of the at least a part of the object; and/or a distance between a camera used for acquiring the image of the at least a part of the object; and/or at least one parameter indicative of a lighting condition for acquiring the image of the at least a part of the object. For example, the angle may be obtained based on an auto-focus function of a camera employed for obtaining the image. In an exemplary embodiment, the method comprises determining the angle and/or the distance based on a template matching process and/or based on an autofocusing process.

For example, in case of the method according to the first aspect, the angle, the distance and/or the parameter indicative of the lighting condition may be obtained e.g. by the at least one first apparatus and may be stored in association with the process information of the object. In other words, in an exemplary embodiment, the method further comprises storing or causing storing the angle, the distance and/or the parameter indicative of the lighting condition in association with the process information of the object, in particular at the database. To this end, the angle, the distance and/or the parameter indicative of the lighting condition may be stored at a database of the at least one first apparatus and/or at a database of the network device, in the latter case via communication via the communication path.

In addition or alternatively, in an exemplary embodiment, the method according to the first aspect comprises causing the angle and/or the distance to be at least within respective predetermined ranges, in particular based on the three-dimensional model of the object. For example, the at least one first apparatus may comprise a display showing the camera view to a user. When pointing the camera towards the object, the at least one first apparatus may be configured to recognize the object via the template matching process and may thereby be configured to determine an angle of the object with respect to the camera (e.g. with respect to an imaging plane of the camera) and/or a distance between the object and the camera. The distance may be alternatively or additionally acquired based on an autofocus processing of the camera. Recognizing the angle and/or the distance, the at least one first apparatus may then guide the user, e.g. via instructions displayed on the display to move the camera until angle and/or distance are within respective predetermined ranges.

In case of the method according to the second aspect, the method comprises a step of obtaining or causing obtaining the angle, the distance and/or the parameter indicative of the lighting condition from the database, in particular from the network device via the communication path, in association with the process information of the object. In other words, when processing the object the at least one second apparatus may for example be configured to guide a user of the second apparatus such that angle and distance may be adjusted to be in correspondence to angle and distance when the image was taken for generating the string of characters for the particular object under inspection.

It is noted that alternatively or in addition, for example in case of a parcel and/or a transport box use of similar angle and/or distance both in case of registering an object as in a later case when for example determining further processing of the object may be ensured by always acquiring images under similar conditions, e.g. by training personnel using the at least one first and/or the at least one second apparatus.

While thus, a method according to the First aspect may be in particular suitable for registering an object in a database, a method according to the second aspect may in particular be suitable for triggering predetermined operations using the registered uniquely identifying string of characters and the associated process information. To this end, similar to the method according to the first aspect, the method according to the second aspect comprises step of obtaining at least one image of at least part of an object.

For example, employing a method according to the first aspect, a courier of a postal and/or logistics company or a customer may take an image of a parcel and/or a transport box upon picking up the parcel and/or transport box for example for a label-less return. Employing the method according to the first aspect, information representing a string of characters comprising a first portion representative of a distance between at least one feature of the object (e.g.

a handwritten marking the courier has drawn onto a surface of the parcel/the transport box) and at least one reference feature of the object (e.g. an edge and/or corner of the parcel/the transport box) is generated and associated, e.g. stored in association, with process information of the object.

Continuing the example, after the courier has picked up the parcel and/or the transport box from the customer the parcel/transport box is processed e.g. by a postal and/or logistics company or service provider e.g. to be returned to a vendor or shop from which the customer has obtained goods included in the parcel and/or transport box. In this example, the at least one second apparatus performing any of the steps of a method according to the second aspect may correspond to a device provided at one or more points of the corresponding postal and/or logistics process, at which the parcel/transport box is subject for example to identification, verification, transfer, relay or guiding processes. For example, the device may be removably (e.g. in form of a mobile device held by personnel of the logistics/postal service provider or a holder of a device) or fixedly installed at a switching point of one or more conveyor belts at which a further transport direction of the parcel and/or the transport box is decided. In this example, the process information associated with the string of characters generated based on the image acquired by the courier when picking up the parcel/the transport box at the customer may correspond to an address of the shop at which the customer has obtained the goods included in the parcel/the transport box.

Performing the method according to the second aspect, as in case of the method according to the first aspect, the device (the at least one second apparatus) is configured to obtain (e.g. to acquire) an image of at least a part of the parcel/the transport box, e.g. when the parcel/the transport box passes a camera of the device on a conveyor belt. Similar to the case of the method according to the first aspect, performing the method according to the second aspect, the device is then configured to obtain information representative of a distance between the at least one feature of the object (e.g. the handwritten marking the courier has drawn onto a surface of the parcel/the transport box) and the at least one reference feature of the object (e.g. the edge and/or corner of the parcel/the transport box) employing procedures as described in relation to the method according to the first aspect. Further similar to the method according to the first aspect, performing the method according to the second aspect, the device is then configured to generate, based in the obtained information, a first siring of characters comprising at least a first portion representative of the distance between the at least one feature of the object present in the image and the at least one reference feature oldie object present in the image.

As the feature of the object (in this example the handwritten marking provided by the courier) under inspection of the device is the feature based on which the string of characters was generated in the first place after the parcel/the transport box was picked up by the courier, the method according to the second aspect, which in this respect is equal to the method according to the first aspect generates the same string of characters. In other words, based on a same object, a device performing the method according to the second aspect is configured to generate a string of characters equal to or at least similar to a string of characters generated by a device performing the method according to the first aspect.

Continuing the example, having obtained the image of the parcel/the transport box, and having generated the string of characters, the device performing the method according to the second aspect is configured for determining or causing determining whether or not a second string of characters is present in a database comprising a first portion corresponding to the first portion of the first string of characters.

As disclosed above, in an exemplary embodiment the at least one second apparatus comprises a database, e.g. stored in a corresponding storage at the at least one second apparatus. In this embodiment, the device may determine whether or not the second string is present in the database by consulting the database comprised by the device. In other words, in an exemplary embodiment, the method according to the second aspect comprises a step of determining or causing determining whether or not a second string of characters is present in the database of the at least one second apparatus comprising a first portion corresponding to the first portion of the first string of characters.

In an additional or alternative exemplary embodiment, the at least one second apparatus is connected to a database via the communication path disclosed herein. In the latter case, in an exemplary embodiment, the database is stored at a network device, e.g. at a network server and/or at a network server cloud. In this embodiment, the method according to the second aspect comprises a step of determining or causing determining whether or not a second string of characters is present in a database comprised by a network device (e.g. a network server and/or server cloud) by communicating with the network device, in particular via the communication path, wherein the second string of characters comprises a lint portion corresponding to the first portion of the first string of characters.

While, based on a same object, the methods according to the first and second aspects should generate a same first portion of a string of characters, it is noted that for example due to transmission and/or processing errors, strings of characters may differ. Thus, in case a second string of characters is not found to be present in the database, and if the first portion of the first string of characters is a baseN (e.g. a base64) string of characters, the at least one second apparatus is in an exemplary embodiment further configured to determine whether or not a second string of characters is present in the database, a string length of a baseN vector of a first portion of which is the same as a string length of a baseN vector of the first portion of the first string of characters. Still further, in addition or alternatively, in case a second string of characters is not found to be present in the database, the at least one second apparatus is in an exemplary embodiment further configured to determine whether or not a second string of characters is present in the database, at least one part of predefined length of a first portion of which is equal to at least one corresponding part of corresponding predefined length of the first portion of the first string of characters.

Further continuing the method according to the second aspect, and continuing the example, the at least one second apparatus is configured for initiating a first predetermined operation based on process information associated with the second string of characters in the database, if a second string of characters is determined to be present in the database. It is noted that the methods according to the first and second aspects are applicable in particular to any one or more of:
- label-less processing of consignment units, in particular of parcels;
- lost & found applications, e.g. at an airport, a train station, a postal service center;
- registration and detection of dangerous goods detection;
- theft & recognition procedures;
- tracking of shipped goods;
- live animal identification/classification.

As mentioned, in the example of a label less return procedure, the process information may for example correspond to an address of the shop at which goods included in the parcel/the transport box have been obtained. Thus, in this case, the first predetermined operation may correspond to output of a control signal setting a direction of movement of the parcel and/or the transport box along one or more conveyor belts in a corresponding facility of the postal and/or logistics company. In other words, in an exemplary embodiment, the first predetermined operation comprises outputting a control signal for controlling a transport device (e.g. the conveyor belt) transporting the object (e.g. the parcel and/or the transport box).

It is noted that in addition or alternatively, for example in case the device is installed at an early stage of a logistics and/or postal process, the first predetermined operation comprises in an exemplary embodiment triggering a printing process for printing an identification label for the object. This process is advantageous in that a further postal and/or logistics process may be carried out in a conventional manner (e.g. using existing equipment) while still providing the advantage that such label is not required for an initial identification process of the parcel and/or of the transport box.

In an additional or alternative exemplary embodiment, the method according to the second aspect may be employed for identifying and correspondingly processing dangerous goods. For example, in case of dangerous goods, process information associated with a string of characters generated based on a corresponding transport box employing the method according to the first aspect to this transport box may comprise corresponding information. Such process information may then trigger a corresponding first operation when applying the method according to the second aspect to this transport box, e.g. the first operation being printing of a corresponding label (e.g. a small sticker) including a warning and/or outputting a suitable control signal for controlling transport of the transport box e.g. within a facility of the logistics and/or postal provider.

In an additional or alternative exemplary embodiment, the method according to the second aspect may be employed for a verification procedure, for example in a "lost&found" context. For example, if in the above example, the parcel and/or transport box is lost after having been picked up by the courier and after the string of characters has been generated and associated (e.g. stored in association) with the process information. In such embodiment, when the parcel and/or the transport box is found, the method according to the second aspect may be employed for verifying identity of the parcel/of the transport box. For example, applying the method according to the second aspect in such situation, in an exemplary embodiment, the at least one second apparatus (e.g. a mobile device of a user identifying the found parcel/the found transport box) is configured for outputting or causing outputting the process information stored in association with the second string of characters in the database. As mentioned, the process information may correspond to an address or a destination of the parcel and/or of the transport box such that it becomes possible to re-enter the found parcel and/or transport box into the postal and/or logistics process. Similarly, the process information may correspond to or comprise a source address (e.g. an address of said customer) such that it becomes possible to at least return the found parcel and/or transport box to the source.

In an alternative or additional embodiment, the object may correspond to a piece of luggage for example checked-in by a passenger at an airport. In this embodiment, the process information may correspond to identification information of the passenger (name, address, serial number of a passport, etc.) and may be associated (e.g. stored in association) with a string of characters uniquely identifying the piece of luggage generated by applying the method according to the first aspect to the piece of luggage. The method according to the second aspect may then be advantageously employed at a destination of the passenger for returning the piece of luggage to the passenger. For example, airport personnel at the destination airport may employ the method according to the second aspect (the at least one apparatus in this case for example corresponding to a mobile device used by the airport personnel or to a device fixedly installed at an airport counter) to identify a piece of luggage as belonging to the passenger and/or to verify that the piece of luggage belongs to the passenger. Thus, in an exemplary embodiment, the method according to the second aspect comprises a step of outputting or causing outputting the process information (e.g. the identification information of the owner of the object) stored in association with the second string of characters in the database.

In an alternative or additional exemplary embodiment, the first predetermined operation comprises outputting or causing outputting information indicating that the second string of characters is present in the database. For example, the at least one second apparatus may be connected to and/or comprise a display and may output this information displaying a suitable confirmation message (e.g. "confirmed", "verified"). Such operation may be an advantageous incomplex operation for confirming/verifying an identity of an object, e.g. that the object is an object registered at an earlier point in time.

Contrarily, in an exemplary embodiment, the method according to the second aspect comprises initiating or causing initiating a second predetermined operation if a second string of characters is determined not to be present in the database. Thereby, in an exemplary embodiment, the second predetermined operation comprises outputting or causing outputting information indicating that the second string of characters is not present in the database. For example, the at least one second apparatus may be connected to and/or comprise a display and may output this information displaying a suitable denial or refusal message (e.g. "not confirmed", "not verified").

Alternatively or in addition, the second predetermined operation comprises outputting a control signal for controlling a transport device transporting the object to a dedicated location. In other words, in case the object is determined to be unknown as no string for identifying the object can be determined, the object can be transported to a dedicated location for further inspection.

As mentioned above, the second portion (comprising the position information representative of a location at which the at least one image of the at least a part of the object has been acquired) and/or the third portion (representative of a point in time when the at least one image is acquired) of the string of characters may in an exemplary embodiment be employed for validation of the string of characters. In order to access the second portion and/or the third portion of the string of characters, the method according to the second aspect comprises in an exemplary embodiment a step of obtaining or causing obtaining a second portion and/or a third portion of the second string of characters from the database.

Based on the obtained second portion and/or the obtained third portion of the second string of characters, the at least one second apparatus is then configured to determine whether or not the second string of characters has been stored in the database as a result of a fraud attempt. For example, the second apparatus may be configured to determine whether or not a time stamp corresponding to the third portion is within an expected time range and/or whether or not a location corresponding to the position information of the second portion is within an expected geographical region. In other words, the method according to the second aspect comprises in an exemplary embodiment a step of determining or causing determining whether or not a point in time represented by the third portion is within a predetermined temporal range and/or whether or not position information comprised by the second portion relates to a position within a predetermined geographical region. Further, the method according to the second aspect comprises in an exemplary embodiment a step of outputting or causing outputting information notifying a fraud attempt relating to the string of characters in case the point in time is determined to be not within the predetermined temporal range and/or in case the position to which the position information relates is not within the predetermined geographical region.

For example, the at least one second apparatus may be connected to and/or comprise a display and may output this information displaying a suitable confirmation message (e.g. "fraud attempt").

In a further exemplary embodiment, the method according to the first aspect comprises a step of outputting or causing outputting information indicating that the object does not comprise a feature suitable for obtaining information representative of a distance between at least one feature of the object present in the image and at least one reference feature of the object present in the image. The information may be output by displaying a corresponding message via a display comprised by the at least one first apparatus.

This exemplary embodiment is of particular advantage in case a surface of an object such as a parcel and/or a transport box is too clean for recognizing a distinctive mark (an example of the at least one feature of the object). In such case, in this exemplary embodiment, the at least one first apparatus is configured for guiding a user of the at least one first apparatus performing the method according to this embodiment of the method according to the first aspect, e.g. by outputting said information to add a visible mark onto a surface of the object (e.g. of the parcel and/or the transport box). For example, output of the information corresponds in an exemplary embodiment to display of an information message (e.g. "add visible mark to surface of parcel") using a display comprised by the at least one first apparatus.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

BRIEF DESCRIPTION OF THE FIGURES

FIG. 1A is a block diagram of an exemplary embodiment of a system according to the invention;

DETAILED DESCRIPTION OF EXAMPLE EMBODIMENTS OF THE INVENTION

Figure 1B:
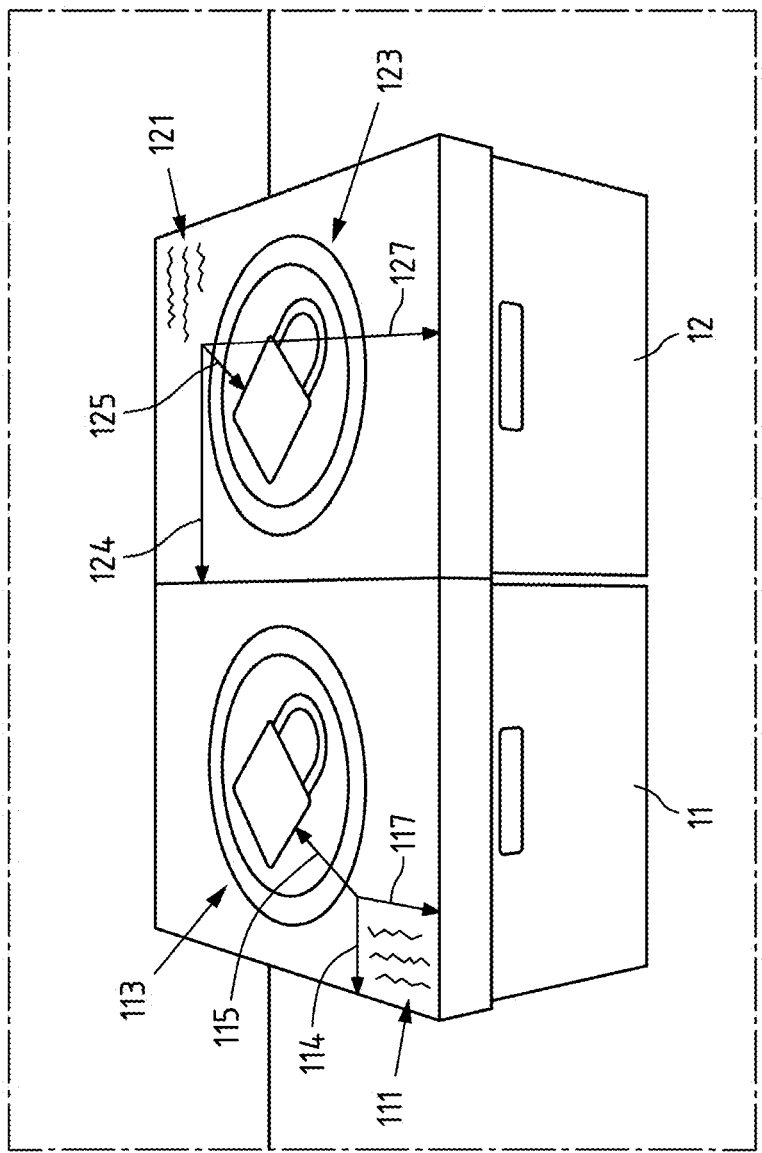
FIG. 1B exemplarily illustrates exemplary embodiments of objects according to the invention.

FIG. 1A is a schematic illustration of an example embodiment of a system 10 comprising a mobile device 2 (an example of the at least one first apparatus), a server 3 (an example of a network device which may correspond to a first example of the at least one first apparatus and to the at least one second apparatus) and a control device 4 installed with a conveyor belt 5. As can be taken from FIG. 1A, mobile device 2 comprises a camera and is thus configured for acquiring (obtaining) an image on an object, which in the shown example corresponds to parcel 1. Mobile device 2 may for example be configured to acquire an image of parcel 1 at an early stage A of a logistics process, e.g. used by a courier upon pick-up of a parcel at a customer for a label-less return of the parcel to a shop where goods included in the parcel have been obtained. Control device 4 comprises a camera 405 connected to control electronics 406 and is thus similarly configured to acquire (obtain) an image of parcel 1, e.g. at a later stage B of the logistics process at which parcel 1 is transported e.g. within a facility of a postal and/or logistics service provider.

As described above, having obtained the at least one image (one or more single shot images or a images included in a video sequence) of at least a part of parcel 1, mobile device 2 is then configured to obtain information representative of a distance between at least one feature of the parcel 1 present in the image and at least one reference feature of the parcel 1 present in the image. Such relative distance information is exemplarily illustrated in FIG. 1B. For example, parcel 11 comprises a handwritten marking 111 and an imprint 113. Arrow 115 illustrates a relative distance between handwritten marking 111 and an imprint 113 and arrows 114, 117 respectively illustrate distances between the handwritten marking 111 and respective edges of the parcel, these relative distances being examples of information representative of a distance between at least one feature (the handwritten marking 111 and the imprint 113) of the parcel 1 and at least one reference feature (the edges) of the parcel 1. As mentioned above, information representative of the at least one feature of the parcel may in addition be stored in association with the string of characters and may be further taken into account.

While parcel 12 is very similar to parcel 11, a differently positioned handwritten marking 121 provides a difference which is reflected in different relative position information as compared to the case of parcel 11, represented by arrows 124, 125 and 127 indicating distances between handwritten marking 121, imprint 123 and respective edges of parcel 12.

This difference in relative position allows generating a different string of characters identifying parcel 12 when employing a method according to the first and second aspects to parcel 12 as compared to a string of characters identifying parcel 11 when employing a method according to the first and second aspects to parcel 11.

For example, employing the method according to the first/and or second aspect, a string of characters may in an exemplary embodiment be generated as follows. First, a Base64 encoded image of the upper face of parcel 11 shown in FIG. 1 is generated. This is used as input for generating a hash string. For example, hash strings generated for parcels such as parcel 11 shown in FIG. 1 may correspond to "C233B06AC10D15F94B60856CC9CB7B92",
"1A8DA04868D5E963BE5F68A3801461F7", or
"A30759D6B4ED144E5E6889676F494465". Such hash strings ("UOIDs") are examples of an exemplary embodiment of the string of characters generated employing a method according to the first and/or second aspect.

Continuing the example, having generated a respective string of characters for a first parcel and for a second parcel, a comparison may in one case lead to a match, i.e. the string of characters generated based on the first parcel is the same as the string of characters generated for the second parcel. The first parcel may in this case be confirmed to correspond to the second parcel. In case the string of characters generated for the first parcel is not identical to the string of characters generated for the second parcel, the first parcel may still correspond to the second parcel. Whereby, for example the second parcel corresponds to the first parcel after a transport procedure whereby one or more features used for generating the first siring of characters (based on the first parcel) have been amended or destroyed. In this case, in an exemplary embodiment, the above mentioned information stored in association with the string of characters (the feature descriptors) may be compared individually to determine unique matches. In the affirmative case, then the second parcel can be recognized as corresponding to the first parcel and e.g. the original UOID can be re-assigned/-confirmed.

Referring back to FIG. 1A, having obtained the image of parcel 1, mobile device 2 generates a string of characters based on the obtained information and associates information representing the string of characters with process information of the parcel 1, e.g. with an address of said shop as a destination for a label-less return process. To this end, mobile device 2 may store the information representing the string of characters with the process information of parcel 1 at a storage of mobile device 2 and/or may transmit the information representing the string of characters in association with the process information of parcel 1 to server 3 via communication path 23 for storing this information in a database 30 stored at server 3. Thus, as shown in FIG. 1A, server 3 comprises a storage for storing such database which stores information representative of respective strings of characters ("Code 1, Code 2, Code 3, Code 4" . . . ) in association with corresponding process information ("ID 1, ID 2, ID 3, ID 4" . . . ).

While mobile device 2 has been described for performing steps of the method according to the first aspect, it is noted that a network device such as server 3 may similarly act as the at least one first apparatus when for example obtaining the image from mobile device 2 and when performing the steps of the method according to the first aspect based thereon.

As further illustrated in FIG. 1A, at a later stage B, control device 4 obtains at least one image of at least a part of parcel 1 using camera 405. Similar to mobile device 2, control device 4 obtains information representative of the distance between the at least one feature of parcel 1 and the at least one reference feature of parcel 1 and generates a first string of characters based thereon. Control device then determines or causes determining whether or not a second string of characters is present in database 30, the second string of characters comprising a first portion corresponding to the first portion or the first string of characters, e.g. via communication with server 3 via communication path 34. If the second string of characters is present in database 30, control device 4 initiates or causes initiating a first predetermined operation based on process information stored in association with the second string of characters in database 30. For example, control device 4 may output a control signal for controlling a direction of travel of parcel 1 along parts of conveyor belt 5 not shown in the figure. Alternatively or in addition, control device 4 may output information using display 404 based on the process information, e.g. for providing information about a content and/or a destination of parcel 1 to a user of control device 4.

It is noted that any of communication paths 23 and 34 described above may be a direct or indirect communication path. For example, any of communication paths 23 and 34 may comprise one or more hops, for example one or more communication links or communication connections. In the context of the present disclosure communication paths are to be understood as (bi-directional) wireless communication connections like 2G/3G/4G/5G cellular wireless connections, Device-to-Device (D2D) communication paths, (bi-directional) wireless communication connections such as Wireless Local Area Network (WLAN) connections, and/or wired computer connections such as buses including in particular USB connections.

Figure 2:
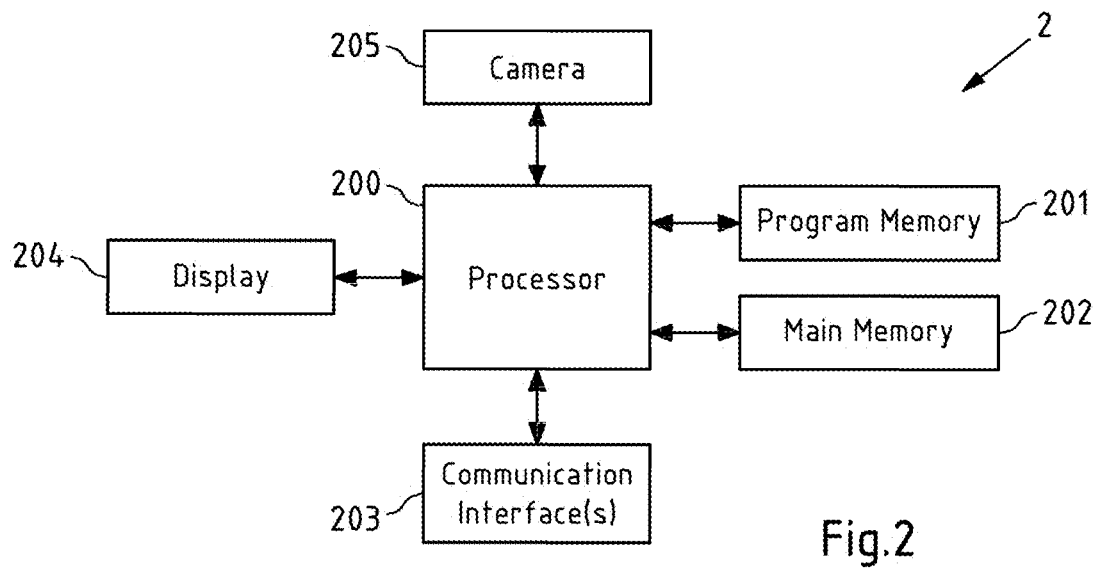
FIG. 2 is a block diagram of an exemplary embodiment of an apparatus according to the first aspect of the invention.

FIG. 2 is a block diagram of an exemplary embodiment of mobile device 2 (an example of the at least one first apparatus). In the following, it is assumed that mobile device 2 of system 10 of FIG. 1 corresponds to mobile device 2 of FIG. 2.

Mobile device 2 comprises a processor 200. Processor 200 may represent a single processor or two or more processors, which are for instance at least partially coupled, for instance via a bus. Processor 200 executes a computer program code to perform any one embodiment of the disclosed method according to the first aspect (e.g. the steps of any one embodiment of the disclosed method) stored in program memory 201 or a part thereof (e.g. at least some steps of any one embodiment of the disclosed method) (as for instance further described below with reference to FIG. 5), and interfaces with a main memory 202. Accordingly, program memory 201 may contain an operating system for processor 200. Some or all of memories 201 and 202 may also be included into processor 200. One of or both of memories 201 and 202 may be fixedly connected to processor 200 or at least partially removable from processor 200, for example in the form of a memory card or stick.

Processor 200 further controls a communication interface 203 which is configured to communicate via a communication network. Mobile device 2 may use communication interface 203 to communicate with external apparatuses such as server 3 (via communication path 23). In the following, it is assumed that communication interface 203 is a wireless or wired communication interface configured for communicating using (bi-directional) communication connections like 2G/3G/4G/5G cellular wireless connections.

Device-to-Device (D2D) communication paths, (bi-directional) wireless communication connections such as Wireless Local Area Network (WLAN) connections, or wired computer connections such as buses including in particular USB connections. In an exemplary embodiment, communication interface 203 may be or may comprise a 2G/3G/4G/5G radio transceiver. For example, mobile device 2 may use communication interface 203 to transmit information representing the string of characters uniquely identifying parcel 1 in association with process information of parcel 1 to server 3 via communication path 23.

Moreover, processor 200 controls a camera 205 (e.g. a digital camera) configured for obtaining an image of at least a part of parcel 1 (as shown in FIG. 1) and a display 204, which may be used e.g. for displaying parcel 1 while acquiring one or more images thereof.

The components 201 to 205 of mobile device 2 may for example be connected with processor 200 by means of one or more serial and/or parallel busses.

It is to be understood that mobile device 2 may comprise various other components like a user interface for receiving user input.

It is noted that mobile device 2 may correspond to the at least one first apparatus when performing the steps of a method according to the first aspect.

Figure 3:
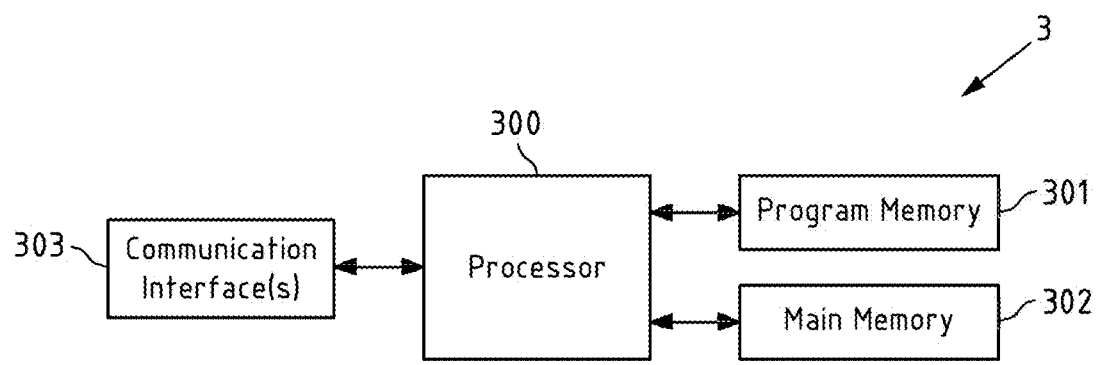
FIG. 3 is a block diagram of an exemplary embodiment of an apparatus according to the first or second aspect of the invention.

FIG. 3 is a block diagram of an exemplary embodiment of server 3. In the following, it is assumed that server 3 of system 10 of FIG. 1 corresponds to server 3 of FIG. 3.

Server 3 comprises a processor 300. Processor 300 may represent a single processor or two or more processors, which are for instance at least partially coupled, for instance via a bus. Processor 300 executes a computer program code (e.g. computer program code causing server 3 to store information representing a string of characters uniquely identifying parcel 1 in association with process information of parcel 1 received from mobile device 2) stored in program memory 301, and interfaces with a main memory 302. Accordingly, program memory 301 may contain an operating system for processor 300. Some or all of memories 301 and 302 may also be included into processor 300. One of or both of memories 301 and 302 may be fixedly connected to processor 300 or at least partially removable from processor 300, for example in the form of a memory card or stick.

Processor 300 further controls a communication interface 303 which is configured to communicate via a communication network Server 3 may use communication interface 303 to communicate with mobile device 2 and/or with control device 4 of system 10. In the following, it is assumed that communication interface 303 is a wireless communication interface configured for communicating via a cellular network (e.g. to transmit and receive cellular radio signals). For example, communication interface 303 may be or may comprise a 2G/3G/4G/5G radio transceiver. It is however to be understood that the invention is not limited to this Interface 303 may similarly be a wireless communication interface configured for communicating via a Device-to-Device (D2D) communication path or a (bi-directional) wireless communication connection in a Wireless Local Area Network (WLAN). For example, server 3 may use communication interface 303 to receive information representing a string of characters in association with corresponding process information from mobile device 2 via communication path 23 and/or to transmit stored information to control device 4 via communication path 34.

The components 301 to 303 of server 3 may for example be connected with processor 300 by means of one or more serial and/or parallel busses.

It is to be understood that server 3 may comprise various other components like a user interface for receiving user input.

It is noted that server 3 may correspond to the at least one first apparatus when performing the steps of the method according to the first aspect, in particular when obtaining the at least one image of the at least a part of the object from mobile device 2. Server 3 may further correspond to the at least one second apparatus when performing the steps of the method according to the second aspect, in particular when obtaining the at least one image of the at least a part of the object from control device 4.

Figure 4:
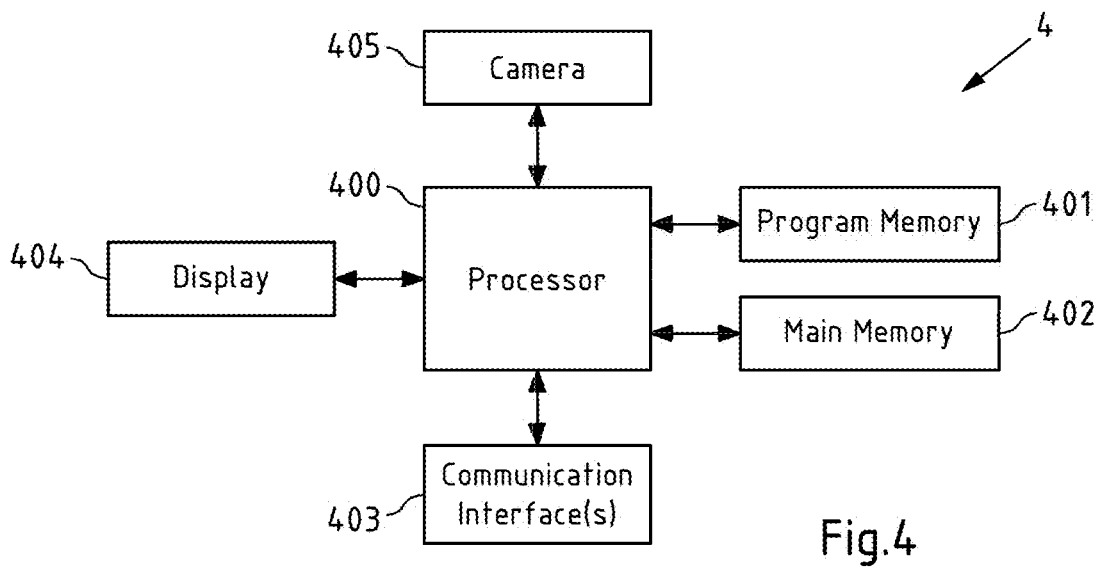
FIG. 4 is a block diagram of a further exemplary embodiment of an apparatus according to the second aspect of the invention.

FIG. 4 is a block diagram of an exemplary embodiment of control device 4. In the following, it is assumed that control device 4 of FIG. 1 corresponds to control device 4 of FIG. 4.

Control device 4 comprises a processor 401). Processor 400 may represent a single processor or two or more processors, which are for instance at least partially coupled, for instance via a bus. Processor 400 executes a computer program code stored in program memory 401 (e.g. computer program code causing control device 4 to perform any one embodiment of the disclosed method according to the second aspect (e.g. the steps of any one embodiment of the disclosed method) or a part thereof (e.g. at least some steps of any one embodiment of the disclosed method) (as for instance further described below with reference to FIG. 6), when executed on processor 400), and interfaces with a main memory 402. Program memory 401 may also contain an operating system for processor 400 and further data. Some or all of memories 401 and 402 may also be included into processor 400. One of or both of memories 401 and 402 may be fixedly connected to processor 400 or at least partially removable from processor 400, for example in the form of a memory card or stick.

A program memory (e.g. program memory 201 and/or program memory 401) may for example be a non-volatile memory. The program memory (e.g. program memory 201 and/or program memory 401) may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable, for instance in the form of a removable SD memory card.

A main memory (e.g. main memory 201 and/or main memory 401) may for example be a volatile memory. It may for example be a DRAM memory, to give non-limiting example. It may for instance be used as a working memory for a processor (e.g. processor 200 and/or processor 400) when executing an operating system and/or programs.

Processor 400 further controls a communication interface 403 which is configured to communicate via a communication network. Control device 4 may use communication interface 403 to communicate with external apparatuses such as server 3 (via communication path 34). In the following, it is assumed that communication interface 403 is a wireless or wired communication interface configured for communicating using (bi-directional) communication connections like 2G/3G/4G/5G cellular wireless connections, Device-to-Device (D2D) communication paths, (bi-directional) wireless communication connections such as Wireless Local Area Network (WLAN) connections, or wired computer connections such as buses including in particular USB connections. In an exemplary embodiment, communication interface 403 may be or may comprise a 2G/3G/4G/

5G radio transceiver. For example, control device 4 may use communication interface 403 to determine, based on the generated first string of characters, whether or not the second string of characters is present in database 30 via communication with server 3 via communication path 34.

Moreover, processor 400 controls a camera 405 (e.g. a digital camera) configured for obtaining an image of at least a part of a surface of passport 1 (as shown in FIG. 1) and display 404. For example, display 404 may be used to display verification information to a user of control device 4 in case the second string is determined to be stored in database 30.

The components 401 to 405 of mobile device may for instance be connected with processor 400 by means of one or more serial and/or parallel busses.

It is to be understood that control device 4 may comprise various other components like a user interface for receiving user input.

It is noted that control device 4 may correspond to the at least one second apparatus when performing the steps of the method according to the second aspect.

Figure 5:
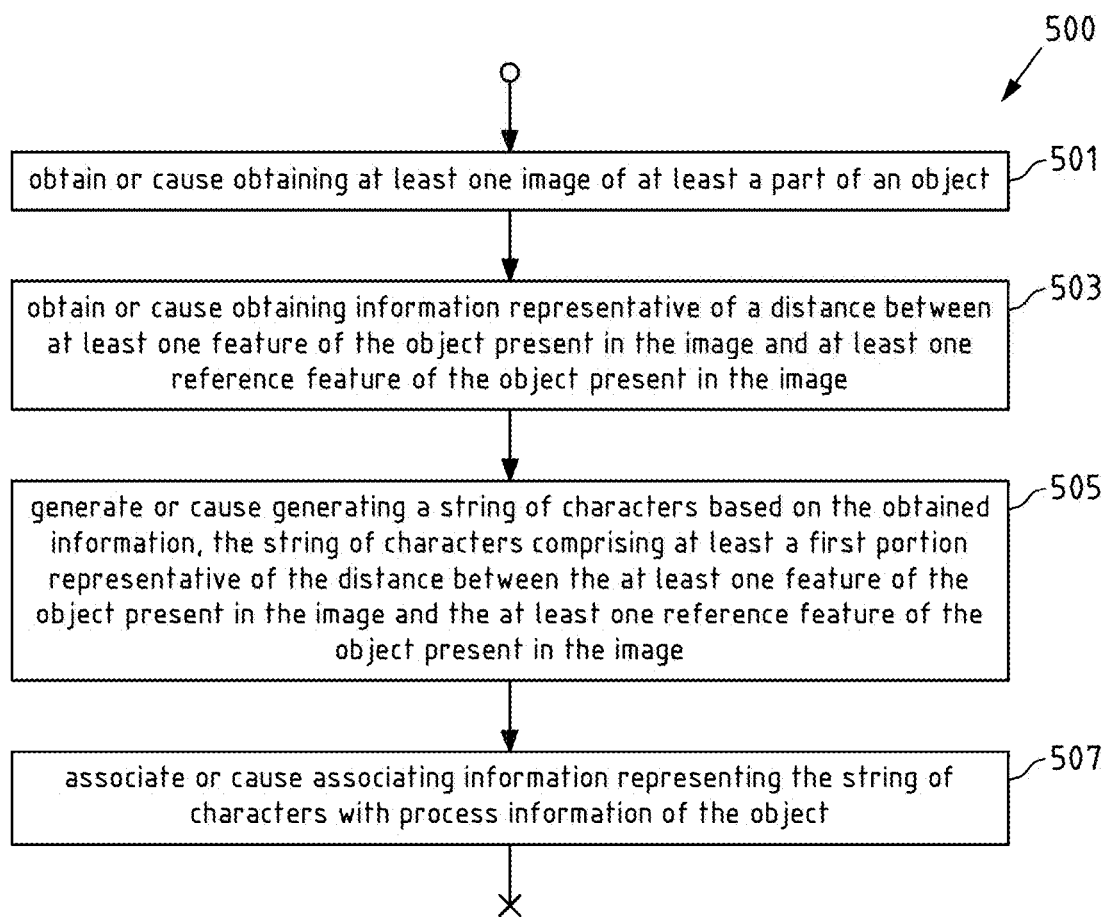
FIG. 5 is a flow chart illustrating an exemplary embodiment of a method according to the first aspect of the invention.

FIG. 5 is a flow chart 500 illustrating an exemplary embodiment of a method according to the first aspect of the invention. Without limiting the scope of the invention, it is assumed in the following that mobile device 2 as disclosed above with respect to FIGS. 1 and 2 performs the steps of flow chart 500. It is noted that the steps of flow chart 501) could likewise be performed by sever 3.

Thus, in step 501, mobile device 2 obtains at least one image of at least a part of an object, e.g. acquires at least one image of at least a part of parcel 1 using at least one camera comprised by mobile device 2. Based thereon in a step 503, mobile device 2 obtains information representative of a distance between at least one feature of parcel 1 present in the image and at least one reference feature of the object present in the image as described above. Further, mobile device 2 generates a string of characters based on the obtained information, the string of characters comprising at least a first portion representative of the distance between the at least one feature of parcel 1 present in the image and the at least one reference feature of parcel 1 present in the image. Mobile device 501 associates information representing the string of characters with process information of parcel 1.

As disclosed, mobile device 2 may for example provide the process information in association with the information representative of the string of characters to be accessible by server 3 via communication path 23 and thereby to be stored in database 30 at server 3. As mentioned, in case of a label-less return, the process information may correspond to a destination address for the label-less return.

Figure 6:
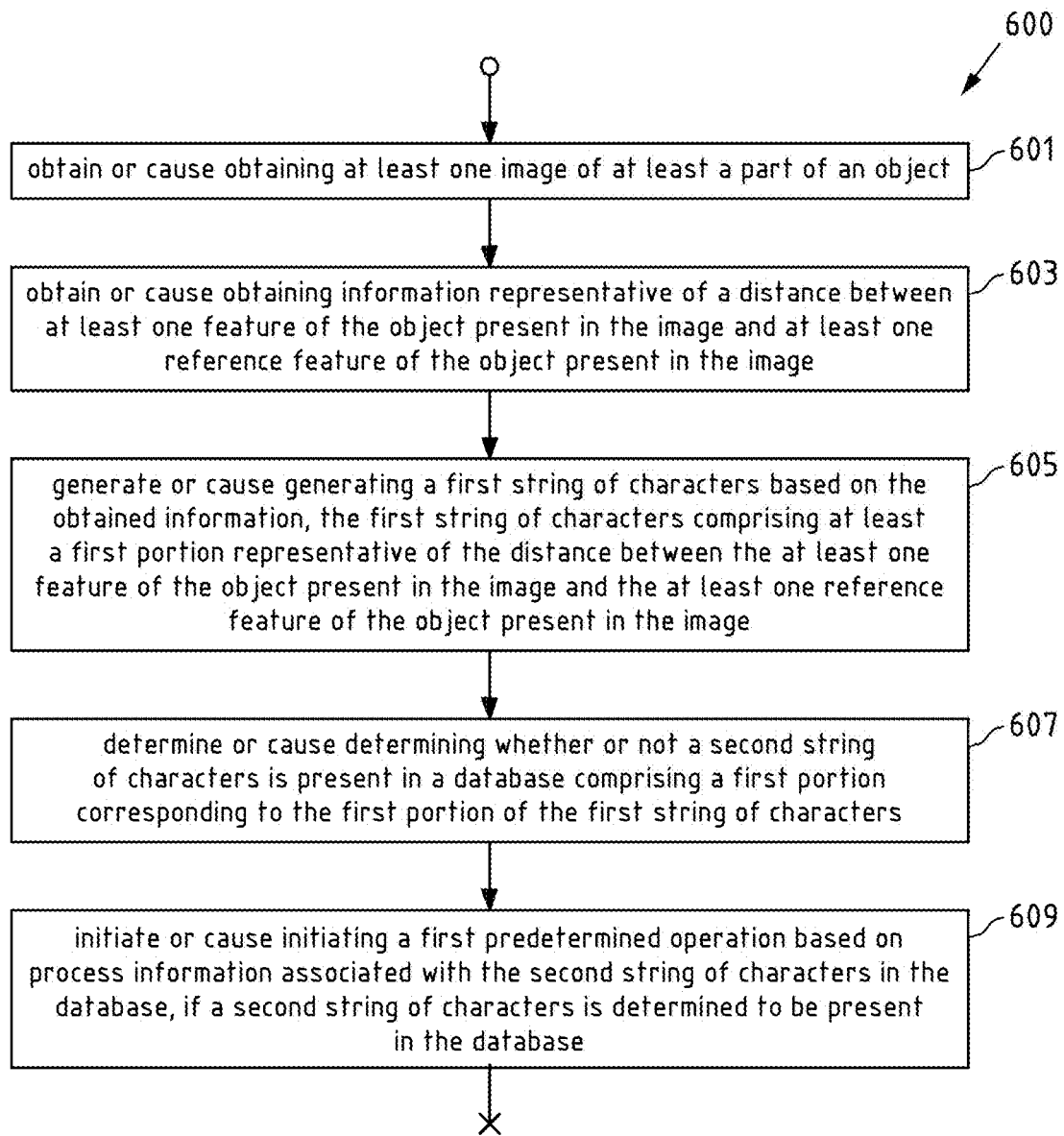
FIG. 6 is a flow chart illustrating an exemplary embodiment of a method according to the second aspect of the invention.

FIG. 6 is a flow chart 600 illustrating an exemplary embodiment of a method according to the second aspect of the invention. Without limiting the scope of the invention, it is assumed in the following that control device 4 as disclosed above with respect to FIGS. 1 and 4 performs the steps of flow chart 600. It is however noted that the steps of flowchart 600 may further be performed by server 3 of FIG. 1.

Thus, in a step 601, control device 4 obtains at least one image of at least a part of an object, e.g. acquires an image of the at least a part of parcel 1 using camera 405. Based thereon, control device 4 obtains information representative of a distance between at least one feature of the object present in the image and at least one reference feature of the object present in the image in step 603 and generates a first string of characters based on the obtained information in step 605, wherein the first string of characters comprises at least a first portion representative of the distance between the at least one feature of the object present in the image and the at least one reference feature of the object present in the image. It is noted that additional features that have been added to parcel 1 for example in between stage A and stage B of FIG. 1 may be ignored when performing step 603. In order to ensure robustness of the method, not all details potentially present on a face of the object are taken into account.

Having generated the first string of characters, control device 4 determines in step 605 whether or not a second string of characters is present in a database comprising a first portion corresponding to the first portion of the first string of characters. In other words, control device 4 determines whether or not a uniquely identifying string of characters has already been registered in the database in association with corresponding process information. In the affirmative case, mobile device 4 initiates a first predetermined operation in step 607, based on process information associated with the second string of characters in the database. For example, in case of a label-less return procedure, control device 4 may output a control signal for controlling further transport of parcel 1, and/or may output information via display 404 informing personnel or a postal and/or logistics provider of a destination of parcel 1.

As mentioned above, in case no exact match is found in the database, the parcel under inspection may still be registered, however, one or more features used for generating the string of characters may have been destroyed or amended e.g. upon transport or the like. In this case, mobile device 4 may individually compare individual feature descriptors with feature descriptors stored in the database to seek for unique, autonomous, matches, if for an object present in the database enough unique matches (high matching grade) are determined, then the object can be recognized (e.g. as parcel 1) and an original string of characters (e.g. UOID) can be re-assigned/-confirmed.

As mentioned above, while the description of system 10 is based on an exemplary object in form of a parcel, the methods according to the first and second aspects are applicable to various classes of objects including e.g. also living animals. The method may be employed based on a characteristic portion of an animal in question, for example in analogy to a fin which is a characteristic portion of a whale and may be used for uniquely identifying a whale within a group of whales.

As a result, employing the methods according to the first and second aspects enables processing e.g. of consignment units such as parcels without any additional identification means such as an identifying label Use of these methods enables use of the inherently present identification provided by particular features present on a surface of such consignment unit.

The following example embodiments of the invention are also disclosed:

Embodiment 1

A method performed by at least one first apparatus, the method comprising:
  obtaining or causing obtaining at least one image of at least a part of an object;
  obtaining or causing obtaining information representative of a distance between at least one feature of the object present in the image and at least one reference feature of the object present in the image;

generating or causing generating a string of characters based on the obtained information, the string of characters comprising at least a first portion representative of the distance between the at least one feature of the object present in the image and the at least one reference feature of the object present in the image;

associating or causing associating information representing the string of characters with process information of the object.

Embodiment 2

The method according to embodiment 1, wherein associating the information representing the string of characters with the process information of the object comprises at least one of the following:
- storing or causing storing the information representing the string of characters with the process information of the object;
- providing or causing providing the information representing the string of characters in association with the process information of the object to be accessible by at least one external apparatus, in particular via a communication path.

Embodiment 3

A method performed by at least one second apparatus, the method comprising:
- obtaining or causing obtaining at least one image of at least a part of an object;
- obtaining or causing obtaining information representative of a distance between at least one feature of the object present in the image and at least one reference feature of the object present in the image;
- generating or causing generating a first string of characters based on the obtained information, the first string of characters comprising at least a first portion representative of the distance between the at least one feature of the object present in the image and the at least one reference feature of the object present in the image;
- determining or causing determining whether or not a second string of characters is present in a database comprising a first portion corresponding to the first portion of the first string of characters;
- initiating or causing initiating a first predetermined operation based on process information associated with the second string of characters in the database, if a second string of characters is determined to be present in the database.

Embodiment 4

The method according to any of the preceding embodiments, further comprising at least one of:
- obtaining or causing obtaining information representative of at least one angle representative of an orientation of the at least one feature with respect to a reference system of the object;
- obtaining or causing obtaining information representative of a three-dimensional shape, in particular of a depth, of the at least one feature of the object present in the image.

Embodiment 5

The method according to any of the preceding embodiments, wherein obtaining the information representative of the distance between the at least one feature of the object and the at least one reference feature comprises at least one of:
- employing or causing employing a spatial transformation and/or a photometric transformation of the at least part of the object;
- obtaining or causing obtaining the distance based on a three-dimensional model or the at least a part of the object;
- identifying or causing identifying the at least one feature and/or the at least one reference feature based on a model, in particular based on a three-dimensional model, of the object.

Embodiment 6

The method according to embodiment 5, further comprising at least one of:
- obtaining or causing obtaining the three-dimensional model from a database;
- generating or causing generating the three-dimensional model based on the at least one obtained image.

Embodiment 7

The method according to any of embodiments 5 or 6, further comprising:
- storing or causing storing the generated three-dimensional model in the database.

Embodiment 8

The method according to any of embodiments 6 or 7, further comprising:
- identifying or causing identifying the object based on a template matching process.

Embodiment 9

The method according to any of the preceding embodiments, wherein the distance between the at least one feature of the object and the at least one reference feature is a distance along a face and/or surface of the object, in particular along a planar face and/or surface of the object.

Embodiment 10

The method according to any of embodiments 3 to 9, wherein the first predetermined operation comprises one of:
- outputting a control signal for controlling a transport device transporting the object;
- outputting or causing outputting the process information stored in association with the second string of characters in the database;
- outputting or causing outputting information indicating that the second string of characters is present in the database;
- trigger or cause triggering a printing process for printing an identification label for the object.

Embodiment 11

The method according to any of embodiments 3 to 9, further comprising:
- initiating or causing initiating a second predetermined operation if a second string of characters is determined not to be present in the database.

Embodiment 12

The method according to any of the preceding embodiments, further comprising:
obtaining or causing obtaining at least one of the following:
- an angle between a camera used for acquiring the image of the at least a part of the object;
- a distance between a camera used for acquiring the image of the at least a part of the object;
- at least one parameter indicative of a lighting condition for acquiring the image of the at least a part of the object.

Embodiment 13

The method according to any of the preceding embodiments, further comprising at least one of:
- obtaining or causing obtaining position information representative of a location at which the at least one image of the at least a part of the object has been acquired, and generating or causing generating a second portion of the string of characters based on the obtained position information;
- obtaining or causing obtaining time stamp information as information indicative of the point in time when acquiring the image of the at least a part of the object and coding the time stamp information for generating a third portion of the string of characters.

Embodiment 14

The method according to any of the preceding embodiments wherein the object corresponds to or comprises a consignment unit, in particular a box and/or a parcel.

Embodiment 15

The method according to any of the preceding embodiments, wherein the three-dimensional model corresponds to a model of a cuboid.

Embodiment 16

The method according to any of the preceding embodiments, wherein the process information of the object corresponds to or comprises at least one of the following:
- identification information of an owner of the object, in particular comprising an address, a name, a data or birth and/or a serial number of a passport of the owner;
- a source address or location, e.g. geocoded location information, of the object;
- a destination address or location, e.g. geocoded location information, of the object;
- information characterizing a content of the object in terms of a safety and/or security status, e.g. weight information, danger classification information, temperature information.

Embodiment 17

The method according to any of the preceding embodiments, wherein the string of characters further comprises at least one of:
- a second portion comprising position information representative of a location at which the at least one image or the at least a pan of the object has been acquired;
- a third portion representative of a point in time when the at least one image is acquired.

Embodiment 18

The method according to any of the preceding embodiments, further comprising at least one of:
- obtaining or causing obtaining position information representative of a location at which the at least one image of the at least a part of the object has been acquired and generating or causing generating a second portion of the string of characters based on the obtained position information;
- obtaining or causing obtaining time stamp information as information indicative of the point in time when acquiring the image of the at least a part of the object and coding the time stamp information for generating a third portion of the string of characters.

Embodiment 19

The method according to embodiment 18, wherein generating the second portion of the string of characters comprises:
geocoding or causing geocoding the position information.

Embodiment 20

The method according to any of embodiments 18 or 19, wherein generating the first portion or the string of characters and/or wherein generating the second portion of the string of characters comprises:
employing or causing employing a hash function.

Embodiment 21

The method according to any of the preceding embodiments, wherein the at least one reference feature corresponds to or comprises a generic and/or typical feature common to a plurality of objects included in a class of objects further including the object.

Embodiment 21

The method according to any of the preceding embodiments, wherein the at least one reference feature corresponds to or comprises a Feature of an object agnostic to space transformation, in particular invariant to scaling, rotation and/or translation and/or a feature agnostic to photometric transformation, in particular at least one geometrical edge of an object.

Embodiment 22

The method according to any of the preceding embodiments, wherein the at least one first apparatus and/or the at least one second apparatus corresponds to or is comprised by a device comprising a digital camera or scanner and/or connected to a digital camera or scanner.

Embodiment 23

The method according to any of the preceding embodiments, wherein the at least one first apparatus and/or the at least one second apparatus corresponds to or is comprised by a mobile device in particular be a smartphone, a tablet computer, a notebook computer, a smart watch, or a smart band.

Embodiment 24

The method according to any of the preceding embodiments, wherein the at least one first apparatus corresponds to or is comprised by a device, e.g. for use by a courier of a postal and/or logistics company, configured for acquiring an image of a consignment unit such as a parcel to be shipped and/or a storage box to be transported.

Embodiment 25

The method according to any of the preceding embodiments, wherein the at least one first apparatus corresponds to or is comprised by a device removably or fixedly installed at a facility of a postal and/or logistics company.

Embodiment 26

The method according to any of the preceding embodiments, wherein the at least one feature of the object comprises or corresponds to at least one of:
- a visible feature and/or attribute of the object present on a surface of the object;
- a distinguishing mark;
- a sticker;
- a macroscopic feature and/or attribute of the object, in particular present on a surface of the object;
- a scratch present on a surface of the object;
- an imprint present on a surface of the object;
- a handwritten marking present on a surface of the object;
- a damage present on a surface of the object,
- a visible mark present on a surface of the object,
- text present on a surface of the object.

Embodiment 27

The method according to any of the preceding embodiments, further comprising:
- outputting or causing outputting information indicating that the object does not comprise a feature suitable for obtaining information representative of a distance between at least one feature of the object present in the image and at least one reference feature of the object present in the image.

Embodiment 28

The method according to embodiment 27, further comprising:
- outputting or causing outputting the information indicating that the object does not comprise a feature suitable for obtaining information representative of a distance between at least one feature of the object present in the image and at least one reference feature of the object present in the image by:
- displaying or causing displaying a notification message via a display comprised by the at least one first and/or second apparatus.

Embodiment 29

An apparatus comprising at least one processor and at least one memory that contains program code, wherein the memory and the program code are configured to use the at least one processor to cause an apparatus to perform and/or control at least the method of any of embodiments 1 to 2.

Embodiment 30

An apparatus comprising at least one processor and at least one memory that contains program code, wherein the memory and the program code are configured to use the at least one processor to cause an apparatus to perform and/or control at least the method of any of embodiments 3 to 28.

Embodiment 31

System comprising at least one first apparatus configured to perform the method according to any of embodiments 1 to 2 and at least one second apparatus configured to perform the method according to any of embodiments 3 to 28.

In the specification, any presented connection in the described embodiments is to be understood in a way that the involved components are operationally coupled. Thus, the connections can be direct or indirect with any number or combination of intervening elements, and there may be merely a functional relationship bets n the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

What is claimed:

1. An apparatus comprising at least one processor and at least one memory including computer program code, the at least one memory and the computer program code configured to, with the at least one processor, cause an apparatus at least to perform or control:
   obtaining or causing obtaining at least one image of at least a part of an object;
   obtaining or causing obtaining information representative of at least one distance between at least one feature of the object present in the image and at least one reference feature of the object present in the image;
   generating or causing generating a string of characters based on the obtained information, the string of characters comprising at least a first portion representative of the distance between the at least one feature of the object present in the image and the at least one reference feature of the object present in the image;
   associating or causing associating information representing the string of characters with process information of the object.

2. The apparatus according to claim 1, wherein associating the information representing the string of characters with the process information of the object comprises at least one of the following:
   storing or causing storing the information representing the string of characters with the process information of the object;
   providing or causing providing the information representing the string of characters in association with the process information of the object to be accessible by at least one external apparatus, in particular via a communication path.

3. The apparatus according to claim 1, wherein the at least one memory and the computer program code are further configured to, with the at least one processor, cause the apparatus at least to perform or control at least one of:
   obtaining or causing obtaining information representative of at least one angle representative of an orientation of the at least one feature with respect to a reference system of the object;
   obtaining or causing obtaining information representative of a three-dimensional shape, in particular of a depth, of the at least one feature of the object present in the image.

4. The apparatus according to claim 1, wherein obtaining the information representative of the distance between the at least one feature of the object and the at least one reference feature comprises at least one of:
   employing or causing employing a spatial transformation and/or a photometric transformation of the at least part of the object;
   obtaining or causing obtaining the distance based on a three-dimensional model of the at least a part of the object.

5. The apparatus according to claim 4, wherein the at least one memory and the computer program code are further configured to, with the at least one processor, cause the apparatus at least to perform or control at least one of:
   obtaining or causing obtaining the three-dimensional model from a database;
   generating or causing generating the three-dimensional model based on the at least one obtained image.

6. The apparatus according to claim 5, wherein the at least one memory and the computer program code are further configured to, with the at least one processor, cause the apparatus at least to perform or control:
   identifying or causing identifying the object based on a template matching process.

7. The apparatus according to claim 1, wherein the distance between the at least one feature of the object and the at least one reference feature is a distance along a face and/or surface of the object, in particular along a planar face and/or surface of the object.

8. The apparatus according to claim 1, wherein the at least one memory and the computer program code are further configured to, with the at least one processor, cause the apparatus at least to perform or control:
   obtaining or causing obtaining at least one of the following:
      an angle between a camera used for acquiring the image of the at least a part of the object;
      a distance between a camera used for acquiring the image of the at least a part of the object;
      at least one parameter indicative of a lighting condition for acquiring the image of the at least a part of the object.

9. The apparatus according to claim 1, wherein the at least one memory and the computer program code are further configured to, with the at least one processor, cause the apparatus at least to perform or control at least one of:
   obtaining or causing obtaining position information representative of a location at which the at least one image of the at least a part of the object has been acquired, and generating or causing generating a second portion of the string of characters based on the obtained position information;
   obtaining or causing obtaining time stamp information as information indicative of the point in time when acquiring the image of the at least a part of the object and coding the time stamp information for generating a third portion of the string of characters.

10. An apparatus comprising at least one processor and at least one memory including computer program code, the at least one memory and the computer program code configured to, with the at least one processor, cause an apparatus at least to perform or control:
   obtaining or causing obtaining at least one image of at least a part of an object;
   obtaining or causing obtaining information representative of a distance between at least one feature of the object present in the image and at least one reference feature of the object present in the image;
   generating or causing generating a first string of characters based on the obtained information, the first string of characters comprising at least a first portion representative of the distance between the at least one feature of the object present in the image and the at least one reference feature of the object present in the image;
   determining or causing determining whether or not a second string of characters is present in a database comprising a first portion corresponding to the first portion of the first string of characters;
   initiating or causing initiating a first predetermined operation based on process information associated with the second string of characters in the database, if a second string of characters is determined to be present in the database.

11. The apparatus according to claim 10, wherein the at least one memory and the computer program code are further configured to, with the at least one processor, cause the apparatus at least to perform or control at least one of:
obtaining or causing obtaining information representative of at least one angle representative of an orientation of the at least one feature with respect to a reference system of the object;
obtaining or causing obtaining information representative of a three-dimensional shape, in particular of a depth, of the at least one feature of the object present in the image.

12. The apparatus according to claim 10, wherein obtaining the information representative of the distance between the at least one feature of the object and the at least one reference feature comprises at least one of:
employing or causing employing a spatial transformation and/or a photometric transformation of the at least part of the object;
obtaining or causing obtaining the distance based on a three-dimensional model of the at least a part of the object.

13. The apparatus according to claim 12, wherein the at least one memory and the computer program code are further configured to, with the at least one processor, cause the apparatus at least to perform or control at least one of:
obtaining or causing obtaining the three-dimensional model from a database;
generating or causing generating the three-dimensional model based on the at least one obtained image.

14. The apparatus according to claim 13, wherein the at least one memory and the computer program code are further configured to, with the at least one processor, cause the apparatus at least to perform or control:
identifying or causing identifying the object based on a template matching process.

15. The apparatus according to claim 10, wherein the distance between the at least one feature of the object and the at least one reference feature is a distance along a face and/or surface of the object, in particular along a planar face and/or surface of the object.

16. The apparatus according to claim 10, wherein the first predetermined operation comprises one of:
outputting a control signal for controlling a transport device transporting the object;
outputting or causing outputting the process information stored in association with the second string of characters in the database;
outputting or causing outputting information indicating that the second string of characters is present in the database;
trigger or cause triggering a printing process for printing an identification label for the object.

17. The apparatus according to claim 10, wherein the at least one memory and the computer program code are further configured to, with the at least one processor, cause the apparatus at least to perform or control:
initiating or causing initiating a second predetermined operation if a second string of characters is determined not to be present in the database.

18. The apparatus according to claim 10, wherein the at least one memory and the computer program code are further configured to, with the at least one processor, cause the apparatus at least to perform or control:
obtaining or causing obtaining at least one of the following:
an angle between a camera used for acquiring the image of the at least a part of the object;
a distance between a camera used for acquiring the image of the at least a part of the object;
at least one parameter indicative of a lighting condition for acquiring the image of the at least a part of the object.

19. The apparatus according to claim 10, wherein the at least one memory and the computer program code are further configured to, with the at least one processor, cause the apparatus at least to perform or control at least one of:
obtaining or causing obtaining position information representative of a location at which the at least one image of the at least a part of the object has been acquired, a generating or causing generating a second portion of the string of characters based on the obtained position information;
obtaining or causing obtaining time stamp information as information indicative of the point in time when acquiring the image of the at least a part of the object and coding the time stamp information for generating a third portion of the string of characters.

20. A method performed by at least one apparatus, the method comprising:
obtaining or causing obtaining at least one image of at least a part of an object;
obtaining or causing obtaining information representative of a distance between at least one feature of the object present in the image and at least one reference feature of the object present in the image;
generating or causing generating a first string of characters based on the obtained information, the first string of characters comprising at least a first portion representative of the distance between the at least one feature of the object present in the image and the at least one reference feature of the object present in the image;
determining or causing determining whether or not a second string of characters is present in a database comprising a first portion corresponding to the first portion of the first string of characters;
initiating or causing initiating a first predetermined operation based on process information associated with the second string of characters in the database, if a second string of characters is determined to be present in the database.

21. The method according to claim 20, further comprising at least one of:
obtaining or causing obtaining information representative of at least one angle representative of an orientation of the at least one feature with respect to a reference system of the object;
obtaining or causing obtaining information representative of a three-dimensional shape, in particular of a depth, of the at least one feature of the object present in the image.

22. A method performed by at least one apparatus, the method comprising:
obtaining or causing obtaining at least one image of at least a part of an object;
obtaining or causing obtaining information representative of at least one distance between at least one feature of the object present in the image and at least one reference feature of the object present in the image;

generating or causing generating a string of characters based on the obtained information, the string of characters comprising at least a first portion representative of the distance between the at least one feature of the object present in the image and the at least one reference feature of the object present in the image;

associating or causing associating information representing the string of characters with process information of the object.

23. A non-transitory computer readable storage medium in which a computer program is stored, the computer program when executed by a processor causing an apparatus or system at least to perform or control:

obtaining or causing obtaining at least one image of at least a part of an object;

obtaining or causing obtaining information representative of at least one distance between at least one feature of the object present in the image and at least one reference feature of the object present in the image;

generating or causing generating a string of characters based on the obtained information, the string of characters comprising at least a first portion representative of the distance between the at least one feature of the object present in the image and the at least one reference feature of the object present in the image;

associating or causing associating information representing the string of characters with process information of the object.

24. A non-transitory computer readable storage medium in which a computer program is stored, the computer program when executed by a processor causing an apparatus or system at least to perform or control:

obtaining or causing obtaining at least one image of at least a part of an object;

obtaining or causing obtaining information representative of a distance between at least one feature of the object present in the image and at least one reference feature of the object present in the image;

generating or causing generating a first string of characters based on the obtained information, the first string of characters comprising at least a first portion representative of the distance between the at least one feature of the object present in the image and the at least one reference feature of the object present in the image;

determining or causing determining whether or not a second string of characters is present in a database comprising a first portion corresponding to the first portion of the first string of characters;

initiating or causing initiating a first predetermined operation based on process information associated with the second string of characters in the database, if a second string of characters is determined to be present in the database.

* * * * *